H. Chisholm
Steel Converting Vessel.
4439
REISSUED JUN 27 1871
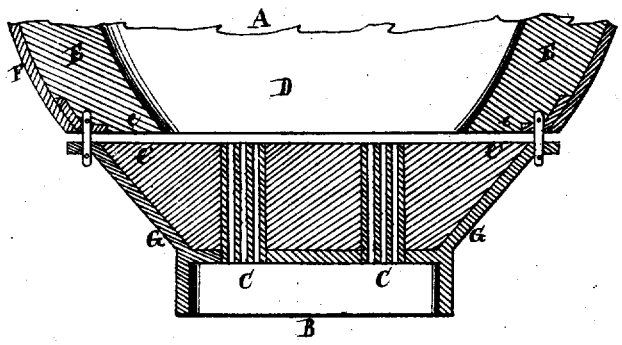
Witnesses.
J. H. Burridge.
D. L. Humphrey.
Inventor.
Henry Chisholm.
per Burridge & Co.
Attorys
AM. PHOTO-LITHOGRAPHIC CO. N.Y. (OSBORNE'S PROCESS.)

UNITED STATES PATENT OFFICE.

HENRY CHISHOLM, OF CLEVELAND, OHIO.

IMPROVEMENT IN APPARATUS FOR THE MANUFACTURE OF BESSEMER STEEL.

Specification forming part of Letters Patent No. 114,109, dated April 25, 1871; reissue No. 4,439, dated June 27, 1871.

*To all whom it may concern:*

Be it known that I, HENRY CHISHOLM, of Cleveland, in the county of Cuyahoga and State of Ohio, have invented certain new and useful Improvements in Bessemer-Steel Converting-Vessels; and I do hereby declare that the following is a full, clear, and complete description of the same.

This improvement in steel-converting vessels relates to forming or making the joint or joints of the sections composing said vessels, used in the manufacture of Bessemer steel and for other analogous uses, so that the lining of the vessel shall be prevented from adhering to the bed or bottom of said vessel in which the tuyeres are placed, when the sections require to be separated, and at the same time make a close tight joint when the sections are together, as more fully set forth in the following specification with reference to the annexed drawing making part of the same.

In the drawing, A represents a portion of the upper section, and B the lower, which are a little apart, showing a space between the two. The tuyeres C communicate with the air-chambers below and the chamber D of the vessel above. E is the lining of fire-clay or ganister in chamber D. F is the casing or shell; G, the casing or shell of the bottom or section B, in which are the tuyeres C and the bed or filling H, which filling and tuyeres may be of the usual material, constructed and arranged in relation to each other in the ordinary way, and also the casings or shells F and G.

It is well known that, in the ordinary way of making the joint or connection of the upper and lower sections of a converting-vessel, it is difficult to remove the bottom or lower section (containing the tuyeres) from the upper section without breaking away the lining at or near the base *e* of the lining. This is owing to the lining E and filling H being composed of fire-clay or its equivalents, combined more or less with other material, to form a coating or lining to resist the action of the molten material in the vessel. This heat so acts upon the material of the lining and filling as to cement them together more or less at the point of contact, indicated *e e'*, when the sections are connected together by the usual means; and in separating the two sections after being used causes the filling and lining to be broken away or torn off, leaving a rough and uneven surface, which has to be separated and put in order before another bottom can be attached, which, owing to the heated state of the vessel, is difficult to do; hence there is more or less hindrance, cost, and delay in detaching a burned-out bottom, repairing the breakage, and attaching a new bottom; and this delay and hindrance often occur when expedition is required to prevent great loss to the manufacturer.

The object of this improvement is to avoid these objections and difficulties in making the joint, which is done by the use of ganister or fire-clay, plumbago, or graphite, or their equivalents, for this purpose.

When the bottom with the tuyeres and filling are ready for connection with the upper section, fire-clay, mixed with water to about the consistency of putty, is laid on the bottom, at *e'*, so as to be under the lining. After the said clay is spread over, its upper surface is dusted over with graphite or its equivalent. This surface of graphite will be in direct contact with the bottom E of the lining when the sections are secured in the ordinary way. The action of the plumbago or graphite prevents cementation of the lining and filling at the point of contact where the sections are connected together and subject to the influence of the molten mass in the conversion, and at the same time a safe and perfectly-formed joint is obtained, and which may be easily separated without injury to the lining or bottom filling.

I do not confine myself to the use of fire-clay and graphite in the order or manner herein described, but to use them in any correlation essentially the same which will produce substantially like results—that is to say, I claim the use of graphite and fire-clay together, or combined with other material or materials, to form the joint or joints in converting-vessels, whether constructed as described or otherwise, and for other analogous uses.

What I claim as my invention, and desire to secure by Letters Patent, is—

Forming or making the joint or joints of steel-converters, and for other like uses, of graphite and fire-clay or ganister, either together or combined with other material or materials.

Witnesses: HENRY CHISHOLM.

J. H. BURRIDGE,

D. O. COLE.